(No Model.)

F. BINN.
NUT LOCK.

No. 606,328.  Patented June 28, 1898.

WITNESSES

INVENTOR
Franklin Binn,
By John Wedderburn
Attorney

UNITED STATES PATENT OFFICE.

FRANKLIN BINN, OF TRENTON, NEW JERSEY.

NUT-LOCK.

SPECIFICATION forming part of Letters Patent No. 606,328, dated June 28, 1898.

Application filed April 14, 1897. Serial No. 632,076. (No model.)

*To all whom it may concern:*

Be it known that I, FRANKLIN BINN, a citizen of the United States, residing at Trenton, in the county of Mercer and State of New Jersey, have invented certain new and useful Improvements in Nut-Locks; and I do hereby declare the following to be a full, clear, and exact description of the invention, such as will enable others skilled in the art to which it appertains to make and use the same.

My invention relates to improvements in nut-locks, and has special reference to that class of nuts which are used for securing wheels upon wagon-axles or for use upon fly-wheels or machinery, the same being especially convenient for use where it is necessary to adjust the parts and secure them in their adjustments.

The invention consists in the novel details of construction hereinafter more particularly set forth and claimed.

Figure 1:
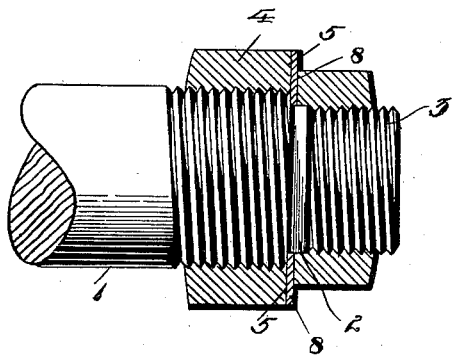
Figure 2:
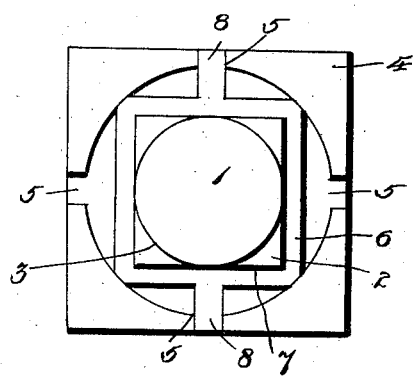

In the accompanying drawings, forming a part of this specification, Figure 1 is a longitudinal sectional view of my improved nut-lock; and Fig. 2 is an end view of the locking-key in position upon the locking-nut, the securing-nut being removed.

Referring to the accompanying drawings, 1 indicates the journal, which is provided with a squared portion 2 and the reduced portion 3.

4 indicates a nut which I term the "holding-nut" and which is adapted to screw upon the journal and is provided upon one of its faces with the notches 5.

A locking key or plate is formed of the body portion 6, having the squared passage 7, whereby it is adapted to fit upon the squared shoulder 2 of the journal, and has the wings or projections 8 extending from opposite sides thereof. These projections 8 are adapted to engage the notches 5 in the faces of the holding-nut.

The holding-nut is first positioned upon the journal and the key placed upon the shoulder of the journal in engagement with the notches of the locking-nut. The locking-nut 9 is then screwed upon the reduced portion of the journal until it bears against the key and secures the same. The inner side of the locking-nut is enlarged, whereby the same may inclose the shoulder 2 on the journal, so that the nut may bear against the locking-key.

The holding-nut may be adjusted as desired, rotation being prevented by the key or locking-plate and the locking-nut. Thus I have produced a very convenient construction where it is desired to adjust the nut and secure it in its adjusted position, as will be understood.

Having thus described my invention, what I claim as new, and desire to secure by Letters Patent, is—

The combination with a bolt having a threaded portion of two different diameters, with an unthreaded rectangular portion between them, of a holding-nut engaging the threaded portion of the greater diameter, and having notches on diametrically opposite sides, and a key having diametrically oppositely disposed projections fitted to said notches and adapted to fit upon the rectangular portion of the bolt, and a lock-nut upon the outer end of said bolt, with an enlarged socket upon its inner face receiving the rectangular portion of the bolt, substantially as herein shown and described.

In testimony whereof I have signed this specification in the presence of two subscribing witnesses.

FRANKLIN BINN.

Witnesses:
WALTON M. WATSON,
NELLIE M. DEWAN.